(12) United States Patent
Wears et al.

(10) Patent No.: US 7,832,425 B2
(45) Date of Patent: Nov. 16, 2010

(54) FLOW FOR PORT GUIDED GLOBE VALVE

(75) Inventors: William E. Wears, Marshalltown, IA (US); Michael W. McCarty, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 197 days.

(21) Appl. No.: 11/469,047

(22) Filed: Aug. 31, 2006

(65) Prior Publication Data

US 2008/0053544 A1    Mar. 6, 2008

(51) Int. Cl.
    *F16K 3/22* (2006.01)
(52) U.S. Cl. .................................. 137/625.33; 251/118
(58) Field of Classification Search .............. 137/625.3, 137/625.33; 251/118, 127
    See application file for complete search history.

(56) References Cited

U.S. PATENT DOCUMENTS

| | | | | |
|---|---|---|---|---|
| 952,187 | A * | 3/1910 | Donnelly | 251/120 |
| 1,796,252 | A * | 3/1931 | Greve | 137/533.17 |
| 1,830,407 | A * | 11/1931 | Prenveille | 251/120 |
| 2,114,858 | A * | 4/1938 | Rosch | 251/122 |
| 2,489,623 | A * | 11/1949 | Delany | 251/210 |
| 2,541,176 | A * | 2/1951 | Rockwell | 137/625.3 |
| 2,649,273 | A * | 8/1953 | Honegger | 251/126 |
| 4,180,240 | A * | 12/1979 | Sheldon et al. | 251/127 |
| 4,356,996 | A * | 11/1982 | Linder et al. | 251/82 |
| 4,624,444 | A | 11/1986 | Johnson | |
| 5,044,604 | A * | 9/1991 | Topham et al. | 251/120 |
| 7,028,712 | B2 | 4/2006 | Wears et al. | |
| 2004/0011412 | A1 * | 1/2004 | Wears et al. | 137/625.33 |

FOREIGN PATENT DOCUMENTS

EP    0 457 132 A1    11/1991

OTHER PUBLICATIONS

Written Opinion and International Search Report for PCT/US2007014595, dated Oct. 31, 2007.

* cited by examiner

*Primary Examiner*—John Fox
(74) *Attorney, Agent, or Firm*—Marshall, Gerstein & Borun LLP

(57) ABSTRACT

A valve assembly includes a valve body, a valve seat, and a valve plug. The valve body defines a flow path for a fluid. The valve plug is adapted for displacement between a closed position and an open position in the valve body. The valve plug includes a crown, a skirt and a protrusion. The crown is for sealingly engaging the valve seat when the valve plug is in the closed position. The skirt defines a flow path for accommodating the fluid when the valve plug is in the open position. The protrusion is substantially concentrically aligned with the skirt. Each of the skirt or the protrusion have a surface treatment for enhancing the flow of the fluid through the valve when in the one or more open positions.

22 Claims, 5 Drawing Sheets

FLOW FOR PORT GUIDED GLOBE VALVE

FIELD OF THE DISCLOSURE

The present disclosure relates generally to control valves and, more particularly, to a port guided globe valve having an increased flow capacity.

BACKGROUND

It is generally known that process plants, such as refineries, chemical plants or pulp and paper plants, consist of numerous process control loops connected together to produce various consumer products. Each of these process control loops is designed to keep some important process variable such as pressure, flow, level, or temperature, within a required operating range to ensure the quality of the end product. Each of these loops receives and internally creates load disturbances that affect the process variable and control of the process control loops within the plant. To reduce the effect of these load disturbances, process variables are detected by sensors or transmitters and communicated to a process controller. A process controller processes this information and provides changes or modifications to the process loop to get the process variable back to where it should be after the load disturbance occurs. The modifications typically occur by changing flow through some type of final control element such as a control valve. The control valve manipulates a flowing fluid, such as gas, steam, water, or chemical compounds, to compensate for the load disturbance and keep the regulated process variable as close as possible to the desired control or set point.

It is generally understood that various control valve configurations may be specifically applicable for certain applications. For example, when a quick-opening valve with a narrow control range is suitable, a rotary control valve, such as a butterfly valve, may be used. Alternatively, when precise control over a large control range is required, a sliding stem control valve may be used. Thus, when designing a process, the process engineer must consider many design requirements and design constraints. The style of valve used and the sizing of the valve can have a large impact on the performance of the control valve in the process control system. Generally, a valve must be able to provide the required flow capacity when the valve is at a specific open position. Flow capacity of the valve is related to the style of valve through the inherent characteristic of the valve.

The inherent characteristic is the relationship between the valve flow capacity and the valve travel when the differential pressure drop across the valve is held constant. Under the specific conditions of constant pressure drop, the valve flow becomes only a function of the valve travel and the inherent design of the valve trim. These characteristics are called the inherent flow characteristic of the valve. Inherent valve characteristic is an inherent function of the valve flow passage geometry and does not change as long as the pressure drop is held constant. Most sliding stem valves have a selection of valve cages or plugs that can be interchanged to modify the inherent flow characteristic. Knowledge of the inherent valve characteristic is useful, but the more important characteristic for purposes of process optimization is the installed flow characteristic of the entire process, including the valve and all other equipment in the loop. The installed flow characteristic is defined as the relationship between the flow through the valve and the valve assembly input when the valve is installed in a specific system, and the pressure drop across the valve is allowed to change naturally, rather than being held constant.

Because of the way it is measured, as defined above, the installed flow characteristic and installed gain are really the installed gain and flow characteristic for the entire process. Typically, the gain of the unit being controlled changes with flow. For example, the gain of a pressure vessel tends to decrease with throughput. Therefore, because the valve is part of the loop process as defined here, it is important to select a valve style and size that will produce an installed flow characteristic that is sufficiently linear to stay within the specified gain limits over the operating range of the system. If too much gain variation occurs in the control valve itself, it leaves less flexibility in adjusting the controller. For example, if the low end of the gain range is too low, a lack of responsiveness can create too much variability in the process during normal operation. However, there is also a danger in letting the gain get too large. The loop can become oscillatory or even unstable if the loop gain gets too high, thus, valve sizing becomes important. For example, it is common to oversize a valves when trying to optimize process performance through a reduction of process variability. Oversizing the valve hurts process variability in two ways. First, the oversized valve puts too much gain in the valve, leaving less flexibility in adjusting the controller. Best performance results when most loop gain comes from the controller. If the valve is oversized, making it more likely to operate in or near this region, this high gain can likely mean that the controller gain will need to be reduced to avoid instability problems with the loop. This, of course, will mean a penalty of increased process variability.

Because an oversized valve produces a disproportionately large flow change for a given increment of valve travel, this phenomenon can greatly exaggerate the process variability associated with dead band due to friction. Regardless of its actual inherent valve characteristic, a severely oversized valve tends to act more like a quick-opening valve, which results in high installed process gain in the lower lift regions. In addition, when the valve is oversized, the valve tends to reach system capacity at relatively low travel, making the flow curve flatten out at higher valve travels. When selecting a valve, it is important to consider the inherent characteristic, and valve size that will provide the broadest possible control range for the application. Adequate flow capacity can be achieve by simply selecting a larger control valve, but oversizing the valve can cause problems. Thus, minimizing the body size of a valve for a particular application provides many benefits.

Minimizing the valve size reduces the cost of the valve itself and reduces the cost of the actuator that controls the valve. Additionally, some process control applications require a valve to maximize flow in two directions, often called a "bi-directional flow application." In a typical bi-directional valve, there is a vertical segment where fluid flows upward. Therefore, flow in one direction is often referred to as flow-up and flow in the other direction is referred to as flow-down. In a majority of applications, valve selection is predicated on the preferred direction of flow through the valve. Port guided globe valves are popular for bi-directional flow applications because they can be utilized regardless of flow direction. A port guided plug is supported by the skirt as the plug slides up and down, guided along an annular valve seat in the valve body irrespective of flow direction. In some cases the annular valve seat serves a dual role as a bearing surface for the plug skirt and as a sealing surface for mating with the sealing surface on the plug. In particular, the skirt acts as a guide to stabilize the valve plug within the valve as fluidic forces place a side load on the plug. A smaller valve stem provides multiple benefits including minimization of the force required to move the plug because there is less friction on the stem from the valve stem packing and seal. Smaller valve stems are also easier to seal because there is less force on the seal due to reduced surface area. Minimizing the size of the valve stem also minimizes the size of the actuator required to move the valve plug due to reduced operating friction. Reduced friction also provides improved plug reaction time and better overall valve performance. One inherent problem with utilizing a port guided globe valve is that the valve plug is typically not fully removed from the valve seat. As a result, skirt material obstructs the flow path and reduces the amount of flow in a full open condition. In addition to decreasing maximum capacity by decreasing the diameter of the flow path, the skirt obstruction results in hydrodynamic drag. Thus, the obstruction presented by the skirt prevents the valve from producing the maximum flow properties found in other valve types having the same port size.

SUMMARY OF THE DISCLOSURE

One aspect of the present disclosure includes a valve plug selectively movable between a closed position and one or more open positions for controlling a flow of a fluid through a valve. The valve plug includes a crown, at least one leg, a protrusion, and a surface treatment. The crown is adapted to engage a valve seat of the valve. The at least one leg extends from the crown. The protrusion extends from the crown and is disposed between the plurality of legs. The surface treatment is carried by at least one of the leg or the protrusion. The surface treatment is adapted to enhance the flow of the fluid through the valve.

According to another aspect, the crown includes a top surface and a bottom surface and the leg and the protrusion extend from the bottom surface.

According to another aspect, the crown includes a peripheral portion and the leg includes a plurality of legs spaced circumferentially about the peripheral portion.

According to another aspect, the plurality of legs each include inner surfaces and side surfaces, the side surfaces define a plurality of windows disposed between the plurality of legs.

According to another aspect, at least one of the inner surfaces or the side surfaces of the plurality of legs includes the surface treatment.

According to another aspect, the surface treatment includes a plurality of elongated recesses.

According to another aspect, the surface treatment includes a plurality of dimples.

According to another aspect, the plurality of elongated recesses are formed in the at least one leg and are disposed substantially equidistant to each other.

According to another aspect, the protrusion includes a substantially frustoconical outer surface portion carrying the surface treatment and the surface treatment includes at least one recess.

According to yet another aspect, the surface treatment carried on the protrusion includes a plurality of concentric recesses.

According to still another aspect, the plurality of recesses carried by the protrusion includes at least one elongated recess formed in a spiral around the frustoconical outer surface portion.

DETAILED DESCRIPTION OF THE DISCLOSURE

Figure 1:
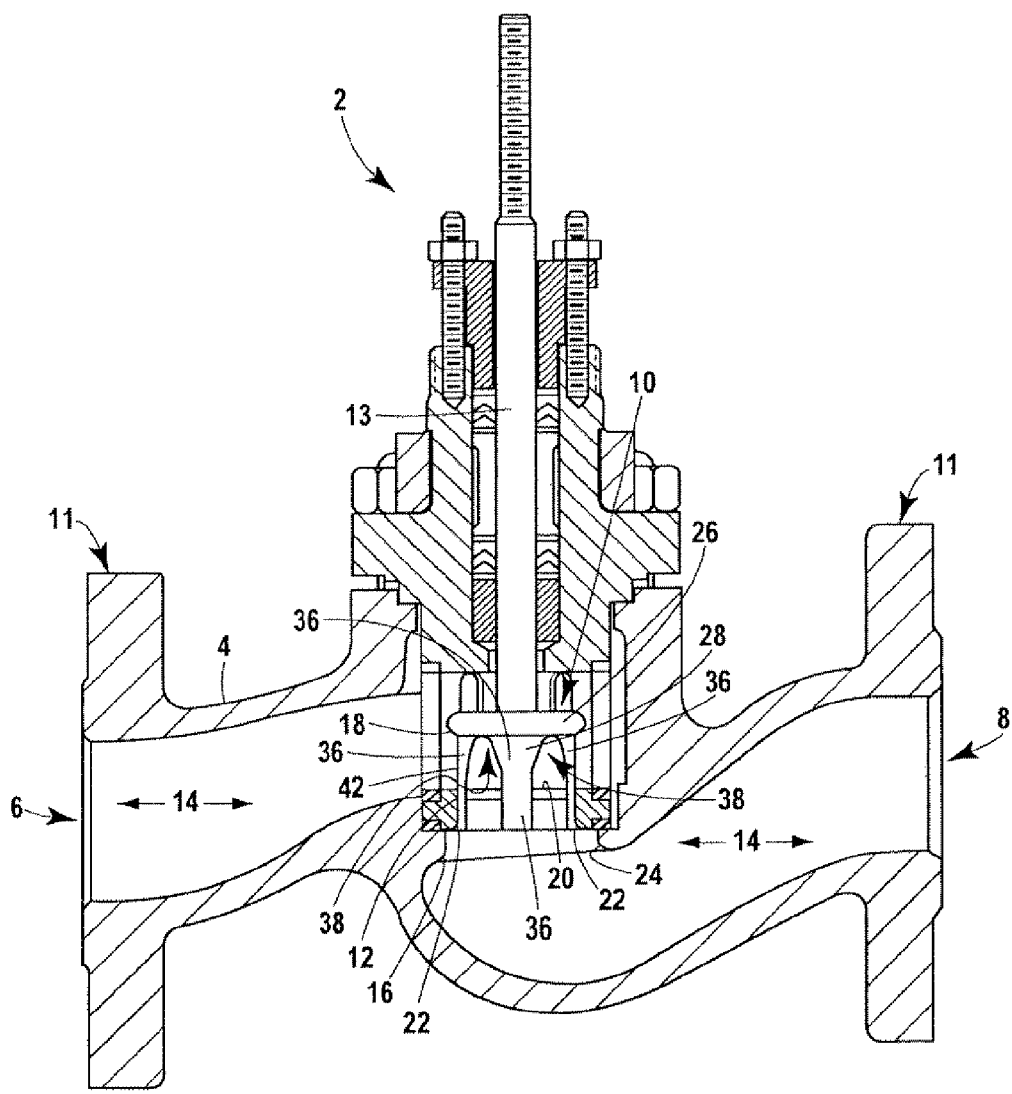
FIG. 1 is a cross-sectional side view of a port guided globe valve including a valve plug constructed in accordance with the principles of the present disclosure.

FIG. 1 illustrates a port guided globe valve assembly 2 arranged in a flow-up configuration. Generally, the globe valve assembly 2 includes a valve body 4, an outlet 6, an inlet 8, a skirted valve plug 10, a valve seat 12, and a stem 13. The outlet 6 and the inlet 8 typically have a mounting mechanism such as a flange 11 for mounting the glove valve 2 into a pipeline in the process control system. The outlet 6 and the inlet 8 are connected by a passageway 14 defined partially by a stepped bore 16. The skirted valve plug 10 is fixed to the stem 13, which is adapted to be reciprocally displaced via an actuator (not shown). Additionally, the valve plug 10 includes a sealing surface 18 and is movably mounted adjacent the stepped bore 16 to control fluid flow through the passageway 14. The valve seat 12 includes an annular body disposed within the stepped bore 16 and has a seating surface 20. The sealing surface 18 of the valve plug 10 engages the seating surface 20 of the valve seat 12 when the valve plug 10 is in a closed position (not shown). In the form disclosed, the valve seat 12 includes a blended edge 22. Additionally, the valve body 4 includes a blended edge 24 disposed at a lower portion of the stepped bore 16. The blended edges 22, 24 of the disclosed form help provide streamlined flow to maximize the flow capacity of the globe valve 2. It should be appreciated that the valve seat 12 may be retained in the valve body 4 in any known or desired manner.

Figure 2:
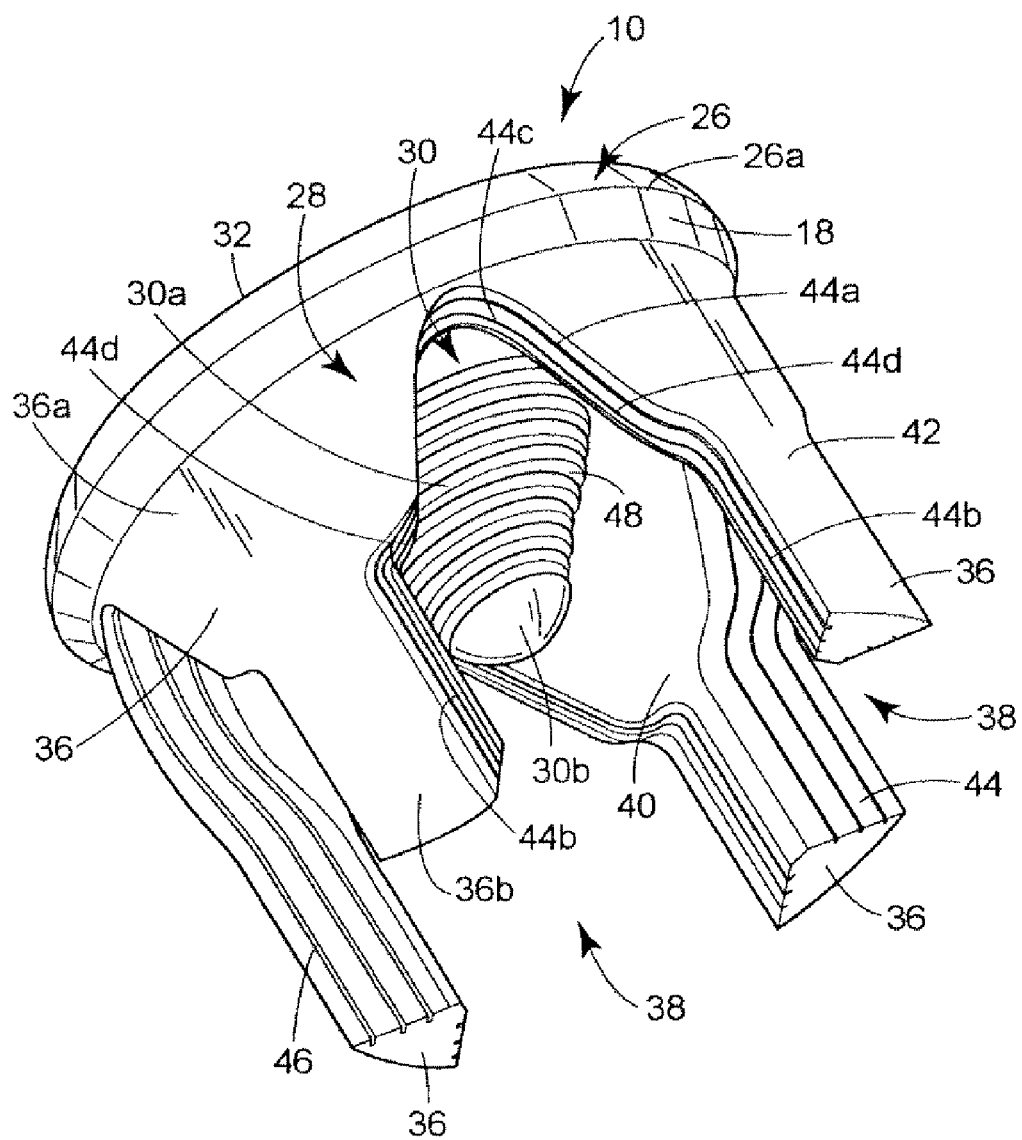
FIG. 2 is a perspective view of one form of a valve plug constructed in accordance with the principles of the present disclosure.

The skirted valve plug 10 generally includes an annular upper portion or crown 26, a skirt 28, and a protrusion 30 (shown in FIG. 2). The skirt 28 is a generally hollow cylindrical body including a plurality of legs 36 defining a plurality of windows 38, as will be discussed in much greater detail below. During operation and while the valve plug 10 is in the open position illustrated in FIG. 1, fluid flowing through the passageway 14 flows from the inlet 8, up through the stepped bore 16, into the valve seat 12, through the windows 38 in the valve plug 10, and to the outlet 6. The protrusion 30 acts as a diverter to separate and agitate the fluid flow as it passes through the valve plug 10. Alternatively, however, when the valve plug 10 is in the closed position, the sealing surface 18 of the crown 26 engages and seals against the seating surface 20 of the valve seat 12. So positioned, the valve plug 10 prevents fluid from flowing through the passageway 14.

Figure 3:
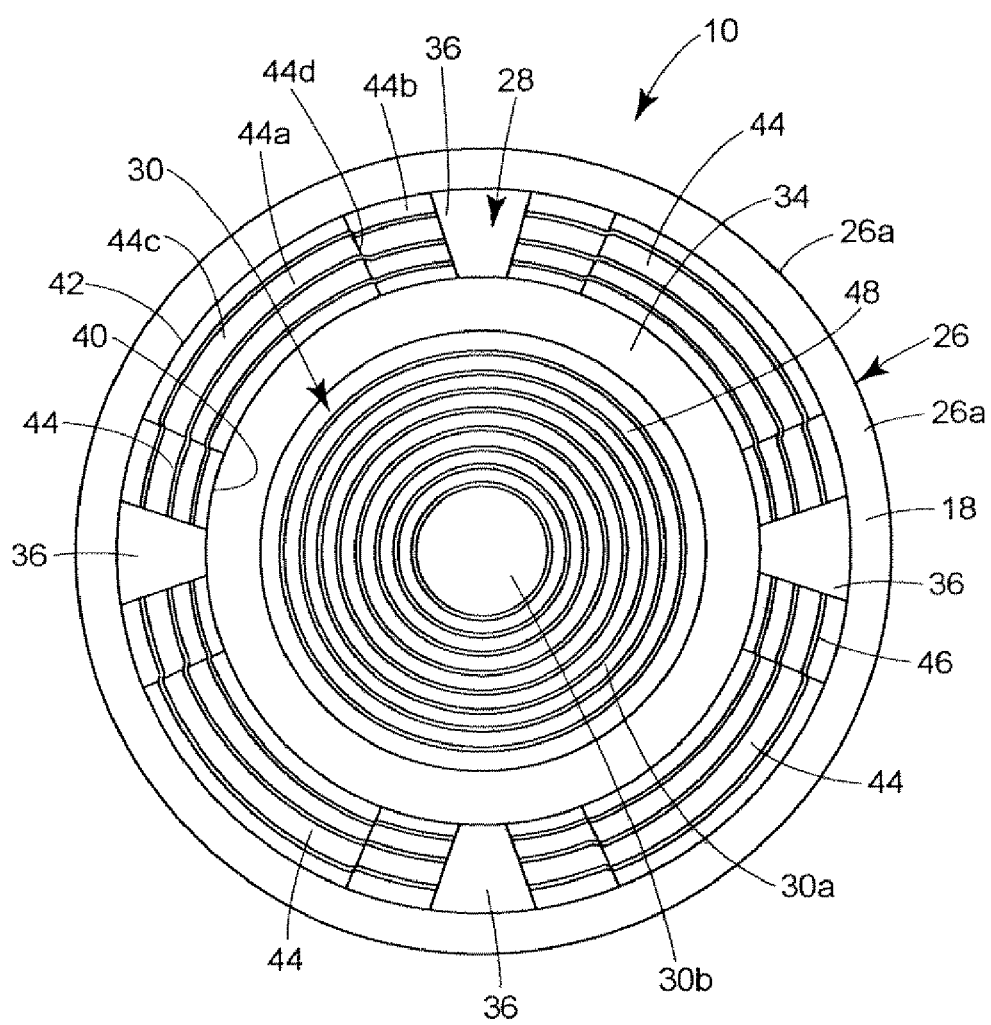
FIG. 3 is an end view of the valve plug of FIG. 2.

Referring now to FIGS. 2-5, various forms of the valve plug 10 constructed in accordance with the principles of the present disclosure will be described in detail. Specifically, FIGS. 2 and 3 illustrate one form of the valve plug 10 including, as stated above, a crown 26, a skirt 28 and a protrusion 30. The crown 26 includes a generally flat circular plate having a top surface 32, a bottom surface 34, and a peripheral portion 26a. In the form depicted, the peripheral portion 26a defines the sealing surface 18 as a surface that is slightly beveled relative to the top and bottom surfaces 32, 34. In the form disclosed, the sealing surface 18 includes a beveled or chamfered sealing surface that serves to optimize a line seal with an upper edge of the valve seat 12.

The skirt 28 extends from the peripheral portion 26a of the bottom surface 34 of the crown 26 and, as stated above, includes a plurality of legs 36 defining a plurality of windows 38. In the form depicted, the skirt 28 includes four legs 36 spaced substantially equally about the peripheral portion 26a of the crown 26. Accordingly, the skirt 28 defines four windows 38 between the legs 36. It should be appreciated, however, that an alternate form of the valve plug 10 may include more or less than four legs 36. It should further be appreciated that an alternate form of the valve plug 10 may include a plurality of legs 36 that are not equally spaced. In addition to including the legs 36, the skirt 28 includes an inner surface 40, an outer surface 42, and a plurality of intermediate surfaces 44. As shown in FIG. 1, the valve plug 10 is disposed within the valve seat 12 such that the outer surface 42 slidingly engages the valve seat 12. As depicted in FIG. 2, the plurality of intermediate surfaces 44 define the legs 36 as having upper portions 36a and lower portions 36b. The upper portions 36a have a generally trapezoidal side view. The lower portions 36b have a generally rectangular side view.

The intermediate surfaces 44 and the legs 36 therefore define the windows 38 as having modified generally upside-down V-shaped or U-shaped side views, as depicted in FIG. 2. Specifically, each of the plurality of intermediate surfaces 44 includes an upper portion 44a and a pair of opposing lower portions 44b. The upper portion 44a axially converges toward the crown 26 into a rounded portion 44c. The lower portions 44b are generally equidistant to each other and disposed on opposite sides of the windows 38. The upper and lower portions 44a, 44b connect a transition portion 44d. Accordingly, the upper portions 44a of the intermediate surfaces 44 define each window 38 as having a generally triangular upper portion. Furthermore, the lower portions 44b of the intermediate surfaces 44 define each window 38 as having a generally square lower portion.

Moreover, as depicted in FIG. 3, the lower portions 44b of the intermediate surfaces 44 act as side walls of each of the legs 36. More specifically, the lower portions 36b of each leg 36 radially converge from the outer surface 42 of the skirt 28 toward the inner surface 40 of the skirt 28. So configured, each leg 36 includes a generally truncated pie-shaped or quarter-circle cross-section, as depicted in FIG. 3. It should be appreciated, however, that in an alternate form of the valve plug 10 not expressly depicted herein, the legs 36 may have generally any shape cross-sections. It should further be appreciated that while the legs 36 have been described as having truncated pie-shaped cross-sections, another form of the valve plug 10 may include intersecting intermediate surfaces 44 defining legs 36 with true pie-shaped cross-sections.

With continued reference to FIGS. 2 and 3, the protrusion 30 includes a dome-shaped body extending from the bottom surface 34 of the crown 26 and generally centered within the skirt 28. More specifically, the protrusion 30 includes a frustoconical portion 30a capped by a hemispherical portion 30b. The intermediate surfaces 44 of the skirt 28 include a surface treatment in the form of a plurality of elongated recesses 46. Particularly, FIGS. 2 and 3 illustrate each intermediate surface 44 including three equidistant elongated recesses 46. The elongated recesses extend generally linearly and continuously from a lower portion 44b on one side of each of the windows 38, through the adjacent transition portion 44d, along the upper portion 44a including the rounded portion 44c, through the next transition portion 44d and finally, through the lower portion 44b on the other side of the window 38. Additionally, the frustoconical portion 30a of the protrusion 30 includes a surface treatment in the form of a plurality of concentric recesses 48. In the form depicted in FIGS. 2 and 3, the frustoconical portion 30a includes nine concentric recesses equally spaced in the axial direction along the protrusion 30.

As described above, when the valve plug 10 is in an open position such as that depicted in FIG. 1, fluid flows from the inlet 8 to the outlet 6 through the valve seat 12 and the windows 38 of the valve plug 10. So configured, the elongated recesses 46 formed in the intermediate surfaces 44 of the valve plug 10 according to this form are disposed substantially perpendicularly to the flow of the fluid. The elongated recesses 46 therefore create turbulence in the fluid flow at the intermediate surface 44. The turbulence created by the surface treatment may reduce fluidic friction and drag (i.e., hydrodynamic drag) along the surface of the valve plug 10 and to maximize a velocity and capacity of the flow of the fluid along the valve plug 10 and, therefore, through the associate valve 2. Additionally, the concentric recesses 48 are disposed generally equidistant to the flow of the fluid through the valve plug 10. So configured, the concentric recesses 10 according to this form of the valve plug 10 may more gradually divert the fluid flow, which may further the amount of friction and drag thereon.

Figure 4:
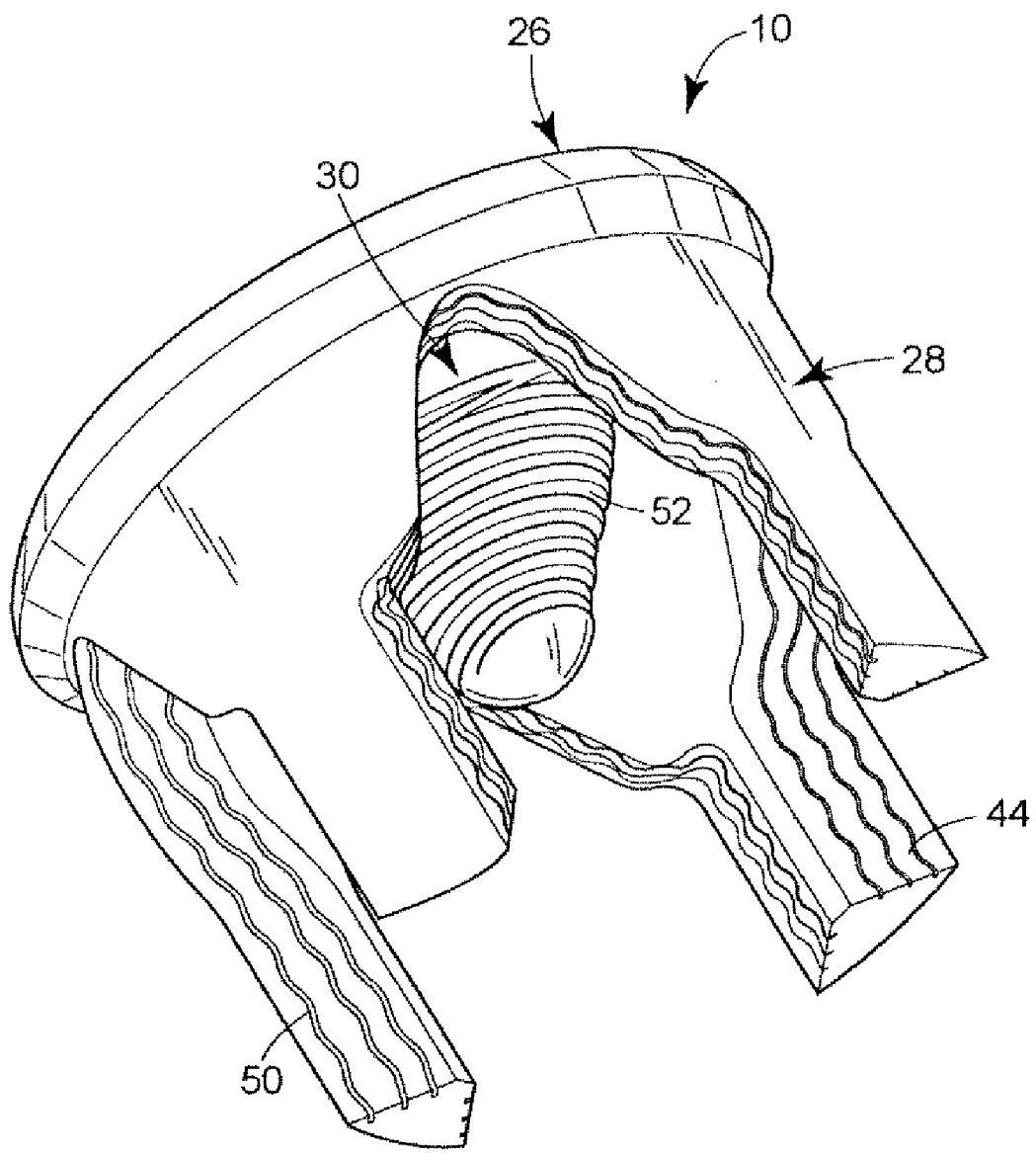
FIG. 4 is a perspective view of another form of the valve plug constructed in accordance with the principles of the present disclosure.

With reference now to FIG. 4, another form a valve plug 10 constructed in accordance with the principles of the present disclosure will be described. Identical to that described above with reference to FIGS. 1-3, FIG. 4 depicts a valve plug 10 including a crown 26, a skirt 28 and a protrusion 30. The arrangement and configuration of the valve plug 10 depicted in FIG. 4 is identical to that described above, with the exception of the surface treatments carried by the intermediate surfaces 44 and the protrusion 30. Specifically, the intermediate surfaces 44 each include a surface treatment in the form of a plurality of elongated recesses 50. In the form illustrated, the plurality of elongated recesses 50 include three recesses 50. The three recesses 50 are equidistant from one another and extend the length of the intermediate surfaces similar to the recesses 46 described above. The recesses 50, however, include a wave pattern. In one form, the recesses 50 may substantially resemble a sine wave pattern or some other similar pattern. FIG. 4 further depicts the protrusion 30 including a surface treatment in the form of a recess 52. The recess 52 formed in the protrusion 30 of the valve body 10 of FIG. 4 includes a single elongated recess 52 formed in a spiral. The protrusion 30 of the depicted form therefore substantially resembles a "corkscrew" arrangement. In another form, the recess 52 may include a plurality of recesses 52 each including a spiral and equidistant to one another, thereby defining the protrusion as a modified corkscrew. Similar to the form described above with reference to FIGS. 2 and 3, the form of the valve plug 10 depicted in FIG. 4 maximizes fluid flow through the valve 2. The recesses 50 on the intermediate surfaces 44 and the recess 52 on the protrusion 30 of the form disclosed serve to generate thin-film turbulence along the surface of the valve plug 10, which may reduce fluidic friction and drag while maximizing fluid velocity and capacity.

Figure 5:
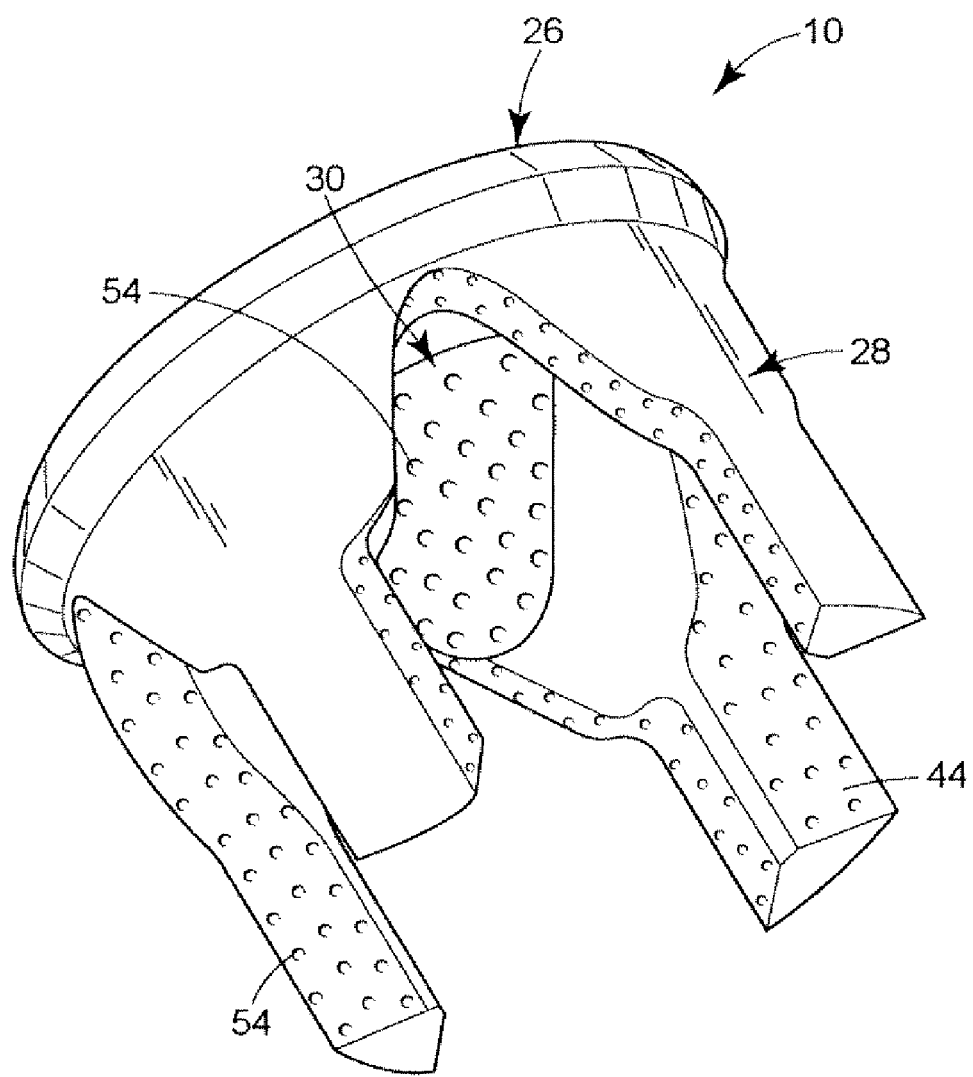
FIG. 5 is a perspective view of yet another form of the valve plug constructed in accordance with the principles of the present disclosure.

With reference now to FIG. 5, another form of a valve plug 10 constructed in accordance with the principles of the present disclosure will be described. Identical to that described above with reference to FIGS. 2-3 and 4, FIG. 5 depicts a valve plug 10 including a crown 26, a skirt 28 and a protrusion 30. The arrangement and configuration of the valve plug 10 depicted in FIG. 5 is identical to that described above, with the exception of the surface treatments carried by the intermediate surfaces 44 and the protrusion 30. Specifically, the intermediate surfaces 44, as well as the protrusion 30, each include surface treatments in the form of a plurality of dimpled recesses 54. In the form illustrated, the dimpled recesses 54 are randomly disposed. In an alternate form, however, the dimpled recesses 54 may be disposed according to one or more predetermined patterns or configurations. In another form, the dimples 54 may not be recesses, but rather protrusions. Similar to the forms described above with reference to FIGS. 2-3 and 4, the form of the valve plug 10 depicted in FIG. 5 maximizes fluid flow through the valve 2. The disclosed dimpled recesses 54 disposed on the intermediate surfaces 44 and the protrusion 30 serve to generate thin-film turbulence along the surface of the valve plug 10, which may reduce fluidic friction and drag while maximizing fluid velocity and capacity.

In light of the foregoing, it should be appreciated that the present application is not limited to the forms of the disclosure presented herein, but rather, is defined by the scope of the claims. Specifically, while the valve plug 10 has been described as including surface treatments in the form of combined elongated recesses 46 and concentric recesses 48, as depicted in FIGS. 2 and 3, or elongated wave recesses 50 and a spiral recess 52, as depicted in FIG. 4, or dimpled recesses 54, as depicted in FIG. 5, alternate forms of the valve plug 10 may include surface treatments taking any configuration of recesses, or alternatively protrusions, or any other structure formed onto or into the surfaces. Additionally, alternate forms of the valve plug 10 may include a surface treatment including combinations of the various forms of the recesses disclosed herein either with each other or with other non-disclosed forms. For example, the surface treatments may be formed from other interrupted or discontinuous surface features similar to the dimpled arrangement previously described or may have directional orientations opposite to those previously shown. Furthermore, while the present disclosure has described the intermediate surfaces 44 and the protrusion 30 as primary locations for the recesses, other forms of the disclosed valve plug 10 may include recesses directly on the inner surface 40 of the skirt 28, the bottom surface 34 of the crown 26 or any other surface of the valve plug 10 that may foreseeably be contacted by flowing fluid. Alternatively the valve plug 10 may include a surface treatment on only one of the protrusion 30 and the intermediate surfaces 44. Still further, alternatively, the valve plug 10 may include a surface treatment on one or more of the bottom surface 34 of the crown 26 and the inner surface 40 of the skirt 28, and not on either the intermediate surfaces 44 or the protrusion 30.

What is claimed:

1. A valve plug selectively movable between a closed position and one or more open positions for controlling a flow of a fluid through a valve, the valve plug comprising:
   a crown adapted to engage a valve seat of the valve;
   a skirt extending from a perimeter of the crown for guiding the valve plug through the valve seat, the skirt being substantially cylindrical in shape and including a plurality of legs, each leg having at least an inner surface, an outer surface, and a pair of intermediate surfaces extending between the inner and outer surfaces;
   a protrusion extending from the crown, the protrusion disposed substantially concentric to the skirt;
   at least one recess formed in the protrusion at a location along the flow of the fluid; and
   a plurality of distinct and separate recesses formed in each intermediate surface of each leg of the skirt at a location along the flow of the fluid, the at least one recess and the plurality of recesses for enhancing the flow of fluid through the valve.

2. The valve plug of claim 1, wherein the at least one recess and the plurality of recesses provide regions of fluid turbulence immediately proximate to the protrusion and the skirt, respectively, to substantially reduce the hydrodynamic drag of the valve plug, wherein the reduction of hydrodynamic drag increases the flow capacity of the valve.

3. The valve plug of claim 1, wherein the skirt is formed from a hollow cylinder extending from the perimeter of the crown.

4. The valve plug of claim 1, wherein the crown includes a top surface and a bottom surface, wherein each leg and the protrusion extends from the bottom surface.

5. The valve plug of claim 1, wherein the crown includes a peripheral portion and the plurality of legs are spaced circumferentially about the peripheral portion.

6. The valve plug of claim 5, wherein the intermediate surfaces of the plurality of legs define a plurality of windows disposed between the plurality of legs.

7. The valve plug of claim 1, wherein the plurality of recesses formed in each intermediate surface of each leg comprises a plurality of elongated recesses that are disposed substantially equidistant to each other.

8. The valve plug of claim 1, wherein the protrusion includes a substantially frustoconical outer surface portion, in which the at least one recess is formed.

9. The valve plug of claim 8, wherein the at least one recess carried by the protrusion includes a substantially spiral recess formed in and around the frustoconical outer surface portion.

10. The valve plug of claim 1, wherein the at least one recess carried by the protrusion includes a plurality of substantially concentric recesses.

11. The valve plug of claim 1, wherein the at least one recess in the protrusion comprises at least one dimple.

12. The valve plug of claim 1, wherein the plurality of recesses in each intermediate surface of each leg comprises a plurality of dimples.

13. A valve plug selectively movable between a closed position and one or more open positions for controlling a flow of a fluid through a valve, the valve plug comprising:
    a skirt including a plurality of circumferentially spaced legs, each leg including an inner surface, an outer surface, and a pair of intermediate surfaces extending between the inner surface and the outer surface, the intermediate surfaces defining a plurality of windows for providing a flow path for the fluid through the valve;
    a protrusion disposed within the skirt;
    a first surface treatment arranged on the protrusion in accordance with a first pattern for enhancing the flow of the fluid through the valve, the first surface treatment including at least one elongated recess; and
    a second surface treatment arranged on each intermediate surface of each leg of the skirt in accordance with a second pattern for enhancing the flow of the fluid through the valve, the second surface treatment including a plurality of distinct and separate elongated recesses.

14. The valve plug of claim 13, wherein the at least one elongated recess of the first surface treatment includes a plurality of substantially concentric recesses.

15. The valve plug of claim 13, wherein the at least one elongated recess of the first surface treatment includes a corkscrew recess.

16. The valve plug of claim 13, wherein the plurality of elongated recesses of the second surface treatment includes a plurality of elongated recesses arranged substantially equidistant to each other.

17. A valve assembly, comprising:
a valve body defining a flow path for a fluid;
a valve seat disposed within the valve body;
a valve plug disposed within the valve body and adapted for displacement between a closed position and one or more open positions, the valve plug including a crown, a skirt and a protrusion,
the crown having a peripheral portion for sealingly engaging the valve seat when the valve plug is in the closed position;
the skirt extending from the peripheral portion of the crown, the skirt including a plurality of legs, each leg having an inner surface, an outer surface, and a pair of intermediate surfaces extending between the inner surface and the outer surface, the intermediate surfaces defining at least one window for accommodating the fluid when the valve plug is in the one or more open positions,
the protrusion disposed substantially concentrically with the skirt,
the skirt having a plurality of distinct and separate recesses formed in each intermediate surface of each leg at a location along the flow path, the protrusion having at least one recess formed therein at a location along the flow path, the plurality of recesses in the skirt and the at least one recess in the protrusion for enhancing the flow of the fluid through the valve when in the one or more open positions.

18. The valve assembly of claim 17, wherein the at least one recess in the protrusion includes a plurality of concentric recesses formed in the protrusion.

19. The valve assembly of claim 17, wherein the plurality of recesses formed in the intermediate surfaces of the legs are formed adjacent the at least one window.

20. The valve plug of claim 17, wherein the plurality of recesses formed in the intermediate surfaces of the legs and the at least one recess formed in the protrusion provides regions of fluid turbulence immediately proximate to the skirt and the protrusion, respectively, to substantially reduce the hydrodynamic drag of the valve plug, wherein the reduction of hydrodynamic drag increases the flow capacity of the valve.

21. The valve plug of claim 17, wherein the at least one recess in the protrusion comprises at least one dimple.

22. The valve plug of claim 17, wherein the plurality of recesses in each intermediate surface of each leg comprises a plurality of dimples.

\* \* \* \* \*

UNITED STATES PATENT AND TRADEMARK OFFICE
CERTIFICATE OF CORRECTION

| | | |
|---|---|---|
| PATENT NO. | : 7,832,425 B2 | Page 1 of 1 |
| APPLICATION NO. | : 11/469047 | |
| DATED | : November 16, 2010 | |
| INVENTOR(S) | : William E. Wears et al. | |

It is certified that error appears in the above-identified patent and that said Letters Patent is hereby corrected as shown below:

At Column 8, line 12, "extends" should be -- extend --.

Signed and Sealed this
Twenty-first Day of June, 2011

David J. Kappos
*Director of the United States Patent and Trademark Office*